(12) United States Patent
Ustuner et al.

(10) Patent No.: US 7,744,532 B2
(45) Date of Patent: Jun. 29, 2010

(54) COHERENCE FACTOR ADAPTIVE ULTRASOUND IMAGING METHODS AND SYSTEMS

(75) Inventors: Kutay F. Ustuner, Mountain View, CA (US); Pai-Chi Li, Taipei (TW); Meng-Lin Li, Taipei (TW); Tom L. Thomas, Palo Alto, CA (US); Albert Gee, Los Alstos, CA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1556 days.

(21) Appl. No.: 10/814,959

(22) Filed: Mar. 31, 2004

(65) Prior Publication Data

US 2005/0228279 A1 Oct. 13, 2005

(51) Int. Cl.
*A61B 5/05* (2006.01)
(52) U.S. Cl. .............. 600/437; 600/443; 600/447; 600/458; 382/210; 382/216; 382/260
(58) Field of Classification Search ............ 600/443, 600/433, 437–440, 463, 407, 458, 447; 382/210, 382/216, 260
See application file for complete search history.

(56) References Cited

U.S. PATENT DOCUMENTS

| | | | |
|---|---|---|---|
| 5,555,534 A | 9/1996 | Maslak et al. | |
| 5,675,554 A | 10/1997 | Cole et al. | |
| 5,685,308 A | 11/1997 | Wright et al. | |
| 5,910,115 A * | 6/1999 | Rigby | 600/443 |
| 6,071,240 A * | 6/2000 | Hall et al. | 600/443 |
| 6,398,733 B1 * | 6/2002 | Simopoulos et al. | 600/443 |
| 6,432,054 B1 * | 8/2002 | Ustuner et al. | 600/437 |
| 6,517,489 B1 * | 2/2003 | Phillips et al. | 600/458 |
| 6,527,720 B1 * | 3/2003 | Ustuner et al. | 600/443 |
| 6,551,246 B1 * | 4/2003 | Ustuner et al. | 600/447 |
| 6,579,238 B1 * | 6/2003 | Simopoulos et al. | 600/443 |
| 6,780,152 B2 * | 8/2004 | Ustuner et al. | 600/443 |
| 2005/0033165 A1 * | 2/2005 | Ustuner et al. | 600/437 |
| 2005/0093859 A1 * | 5/2005 | Sumanaweera et al. | 345/419 |

OTHER PUBLICATIONS

"A New Adaptive Imaging Technique Using generalized Coherence Factor," by Meng-Lin Li and Pai-Chi Li; Department of Electrical Engineering, National Taiwan University, Taipei, Taiwan, R.O.C.; 2002 IEEE Ultrasonics Symposium; pp. 1586-1589.

(Continued)

*Primary Examiner*—Brian Casler
*Assistant Examiner*—Joel M Lamprecht

(57) ABSTRACT

Ultrasound imaging adapts as a function of a coherence factor. Various beamforming, image forming or image processing parameters are varied as a function of a coherence factor to improve detail resolution, contrast resolution, dynamic range or SNR. For example, a beamforming parameter such as the transmit or receive aperture size, apodization type or delay is selected to provide maximum coherence. Alternatively or additionally, an image forming parameter, such as the number of beams for coherent synthesis or incoherent compounding, is set as a function of the coherence factor. Alternatively or additionally an image processing parameter such as the dynamic range, linear or nonlinear video filter and/or linear or nonlinear map may also adapt as a function of the coherence factor.

18 Claims, 1 Drawing Sheet

OTHER PUBLICATIONS

Blocked Element Compensation In Phased Array Imaging Li, P.-C.; Flax, S.W.; Ebbini, E.S.; Oapos; and Donnell, M. Ultrasonics, Ferroelectrics and Frequency Control, IEEE Transactions on vol. 40, Issue 4, Jul. 1993 pp. 283-292.

A Fourier Transform-Based Sidelobe Reduction Method In Ultrasound Imaging Mok-Kun Jeong Ultrasonics, Ferroelectrics and Frequency Control, IEEE Transactions on vol. 47, Issue 3, May 2000 pp. 759-763.

Coherence factor of speckle from a multi-row probe Hollman, K.W.; Rigby, K.W.; and O'Donnell, M. Ultrasonics Symposium, 1999. Proceedings. 1999 IEEE vol. 2, Oct. 17-20, 1999 pp. 1257-1260 vol. 2.

Efficient parallel adaptive aberration correction Krishnan, S.; Rigby, K.W.; and O'Donnell, M. Ultrasonics, Ferroelectrics and Frequency Control, IEEE Transactions on vol. 45, Issue 3, May 1998 pp. 691-703.

Adaptive compensation of phase and magnitude aberrations Krishnan, S.; Pai-Chi Li; and O'Donnell, M. Ultrasonics, Ferroelectrics and Frequency Control, IEEE Transactions on vol. 43. Issue 1, Jan. 1996 pp. 44-55.

* cited by examiner

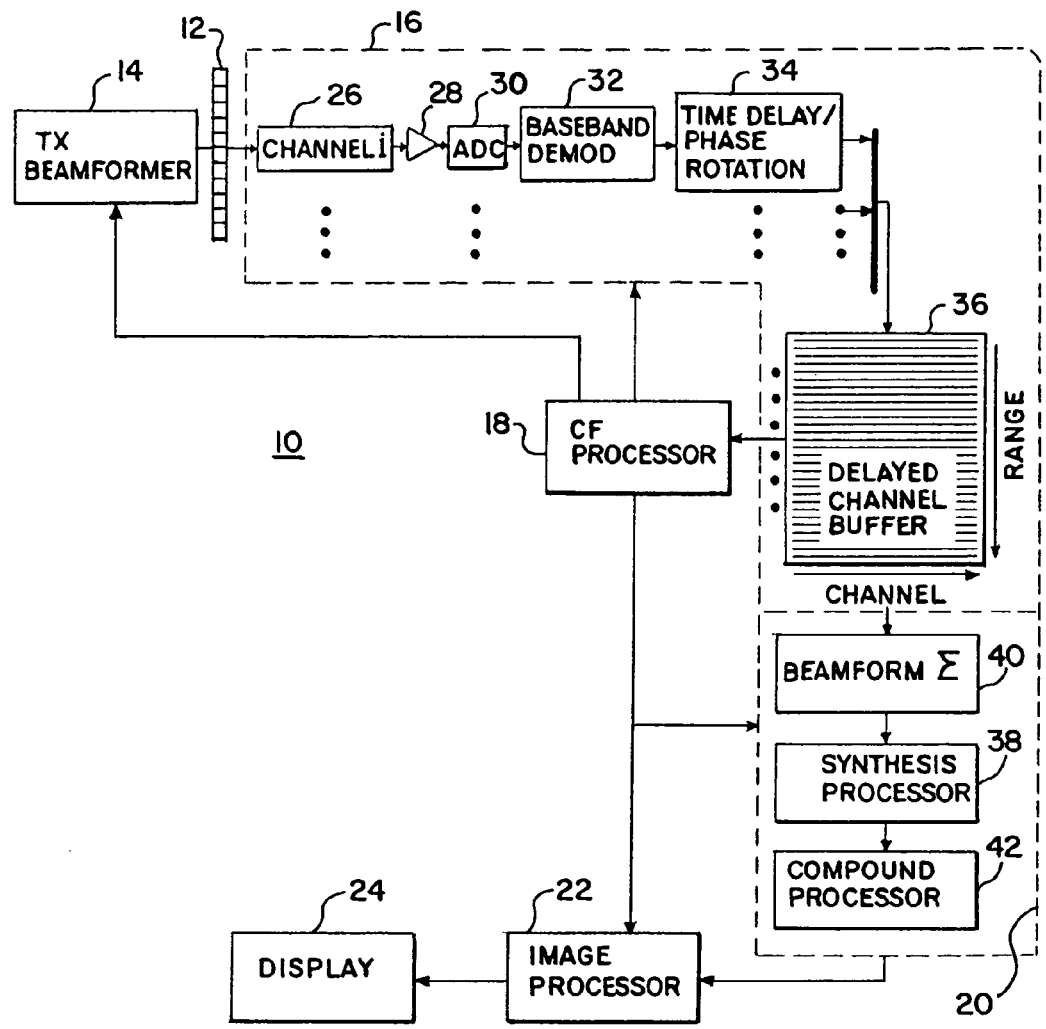
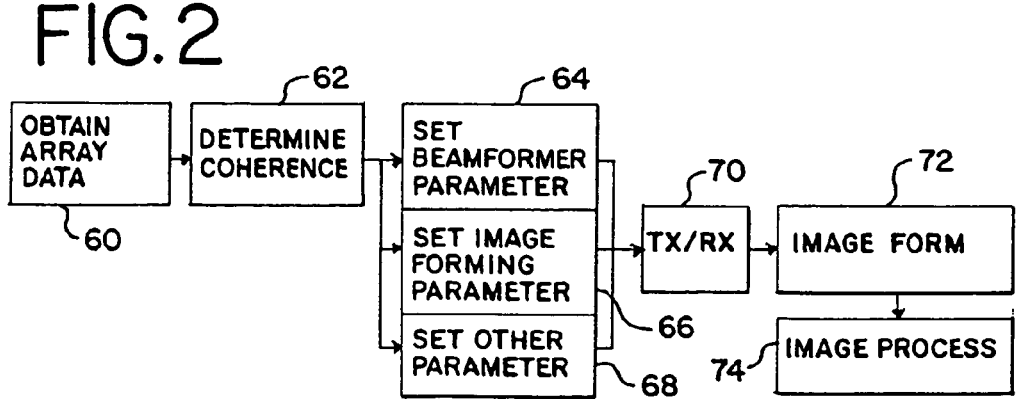

COHERENCE FACTOR ADAPTIVE ULTRASOUND IMAGING METHODS AND SYSTEMS

BACKGROUND

This invention relates to adaptive beamforming, image forming and image processing for ultrasound imaging. In particular, the adaptation is a function of coherence of echo received on a plurality of transducer elements.

In ultrasound imaging systems, signals from targets that are on-axis or in the main lobe sum with signals from targets that are off-axis, in the grating-lobe or side-lobes, reducing channel-to-channel coherence of signals. Reduced coherence may result in reduced detail resolution, contrast resolution, dynamic range and signal-to-noise ratio. Focusing errors from sound velocity and/or attenuation inhomogeneities elevates sensitivity to off-axis targets. These focusing errors further reduce the channel-to-channel coherence.

A measure of an amount of coherence has been used to adapt processing. The ratio of the amplitude of coherently summed signals to incoherently summed signals, i.e., coherence factor, is computed for each pixel. Beamforming delay is applied to the signals before calculating the coherence factor. The coherence factor or a combination of the coherence factor and the amplitude is displayed. In another approach, the coherence factor is calculated as the amplitude ratio of conventionally focused to unfocused (e.g., flat time delay profile) signals. In both approaches, if the coherence factor is low then acoustic clutter is assumed high, and therefore the pixel brightness is suppressed.

In U.S. Pat. No. 6,432,054, a coherence factor is used as a weight. Two received beams are summed incoherently (i.e., compounded) and summed coherently (i.e., synthesized). The coherence factor from one or both of the two received beams weights the compounded and synthesized beams. The weighted beams are then used to form an image. If the coherence factor is high, the weight for the synthesized beam is increased and thus the resolution is improved. Otherwise, the weight for the compounded beam is increased and thus contrast resolution is improved.

Coherence factor adaptive pixel weighting techniques may cause increased speckle variance. Low-pass filtering coherence factor images prior to determining the pixel weights may reduce the effect on the speckle variance. But the filtered coherence factor approach may not perform well in regions outside the depth of field of transmit focus.

In a different approach for adaptive side-lobe suppression, data from parallel receive beams in response to and around a fixed transmit beam (i.e., single transmit imaging) are used to estimate side-lobe contribution. For every pixel, a total least-squares calculation is performed. The contribution of side-lobes is then suppressed. However, the calculations require a large memory and an iterative scheme, making real-time implementation difficult and expensive. An approximation to parallel receive beamforming has been provided with a Fourier transform across channels of the received signal.

A generalized coherence factor including non-DC components of the Discrete Fourier Transform across received channels has been proposed. This generalized coherence factor provides an index of the beamforming quality that may perform adequately even for speckle targets and outside the depth of field. The generalized coherence factor weights image data to reduce the image brightness where the coherence factor is low, i.e., focusing is poor. An efficient FFT based technique has been proposed to calculate the generalized coherence factor.

BRIEF SUMMARY

The preferred embodiments described below include methods and systems for adaptive ultrasound imaging. A coherence factor is calculated. Rather than or in addition to clutter suppression by weighting pixel amplitudes, the transmit and/or receive apertures adapt as a function of the coherence factor. For example, an aperture size is selected to provide maximum coherence. In another example, apodization or delay is adapted as a function of coherence factor. Alternatively or additionally, an image forming parameter, such as the number of beams for synthesis or compounding, is set as a function of the coherence factor. By adapting beamforming or image forming parameters rather than or in addition to amplitude weighting of data, the effect of aberration on contrast resolution may be minimized. Image processing, such as dynamic range, nonlinear filtering and/or nonlinear mapping, may also adapt as a function of the coherence factor.

In a first aspect, a method is provided for adaptive ultrasound beamforming. In response to a pulse excitation, echoes from an object are received on a plurality of transducer elements. A coherence factor is determined as a function of the receive signals from the elements. A beamforming parameter is set as a function of the coherence factor.

In a second aspect, a system is provided for adaptive ultrasound beamforming. A transducer has a plurality of elements. A processor is operable to determine a coherence factor as a function of receive signals from the elements. A beamformer connects with the transducer. A beamforming parameter is responsive to the coherence factor.

In a third aspect, a method is provided for adaptive ultrasound image forming. In response to a pulse excitation, echoes from an object are received on a plurality of transducer elements. A coherence factor is determined as a function of the received signals from the elements. An image forming parameter is set as a function of the coherence factor.

In a fourth aspect, a system is provided for adaptive ultrasound image forming. A transducer has a plurality of elements. A coherence factor processor is operable to determine a coherence factor as a function of received signals from the elements. An image forming processor is operable to form images as a function of the coherence factor.

In a fifth aspect, a method for adaptive ultrasound image processing is provided. In response to pulse excitation, echoes from an object are received on plurality of transducer elements. A coherence factor is determined as a function of the receive signals. One of a dynamic range, a non-linear filter, a non-linear map and combinations thereof is set as a function of the coherence factor.

In a sixth aspect, a system for adaptive ultrasound image processing is provided. A transducer has a plurality of elements. A coherence factor processor is operable to determine a coherence factor as a function of received signals from the elements. An image processor is operable to set one of dynamic range, a non-linear filter, a non-linear map and combinations thereof as a function of the coherence factor.

The present invention is defined by the following claims, and nothing in this section should be taken as a limitation on those claims. Further aspects and advantages of the invention are discussed below in conjunction with the preferred embodiments.

BRIEF DESCRIPTION OF THE DRAWINGS

The components and the figures are not necessarily to scale, emphasis instead being placed upon illustrating the FIG. 1 is a block diagram of one embodiment of a system for adaptive imaging; and FIG. 2 is a flow chart diagram of one embodiment of a method for adaptive imaging.

DETAILED DESCRIPTION OF THE DRAWINGS AND PRESENTLY PREFERRED EMBODIMENTS

Adaptive imaging is based on a coherence factor. The coherence factor describes coherence of the receive signals across an array of elements, such as ultrasound signals received during pulse-echo phased-array imaging. The coherence factor is used to determine the degree of coherency of the signals from elements. Once the degree of coherency is determined, various parameters may be optimized, such as beamforming, imaging forming or image processing. For example, the optimal receive aperture size at an imaging position is determined. Adapting the receive aperture size based on the coherence factor may reduce focusing errors caused by sound-velocity inhomogeneities.

FIG. 1 shows one embodiment of a system 10 for adaptive ultrasound imaging. The system 10 is an ultrasound imaging system, but other imaging systems using multiple transmit or receive antennas (i.e., elements) may be used. The system 10 includes a transducer 12, a transmit beamformer 14, a receive beamformer 16, a coherence factor processor 18, an image forming processor 20, an image processor 22 and a display 24. Additional, different or fewer components may be provided, such as a system 10 without the display 24.

The transducer 12 is an array of a plurality of elements. The elements are piezoelectric or capacitive membrane elements. The array is configured as a one-dimensional array, a two-dimensional array, a 1.5 D array, a 1.25 D array, a 1.75 D array, an annular array, a multidimensional array, combinations thereof or any other now known or later developed array. The transducer elements transduce between acoustic and electric energies. The transducer 12 connects with the transmit beamformer 14 and the receive beamformer 16 through a transmit/receive switch, but separate connections may be used in other embodiments.

Two different beamformers are shown in the system 10, a transmit beamformer 14 and the receive beamformer 16. While shown separately, the transmit and receive beamformers 14, 16 may be provided with some or all components in common. Both beamformers connect with the transducer array 12. The transmit beamformer 14 is a processor, delay, filter, waveform generator, memory, phase rotator, digital-to-analog converter, amplifier, combinations thereof or any other now known or later developed transmit beamformer components. In one embodiment, the transmit beamformer 14 is the transmit beamformer disclosed in U.S. Pat. No. 5,675,554, the disclosure of which is incorporated herein by reference. The transmit beamformer is configured as a plurality of channels for generating electrical signals of a transmit waveform for each element of a transmit aperture on the transducer 12. The waveforms have relative delay or phasing and amplitude for focusing the acoustic energy. The transmit beamformer 14 includes a controller for altering an aperture (e.g. the number of active elements), an apodization profile across the plurality of channels, a delay profile across the plurality of channels, a phase profile across the plurality of channels and combinations thereof. A scan line focus is generated based on these beamforming parameters. Alteration of the beamforming parameters may correct for aberrations.

The receive beamformer 16 is a preamplifier, filter, phase rotator, delay, summer, base band filter, processor, buffers, memory, combinations thereof or other now known or later developed receive beamformer components. In one embodiment, the receive beamformer is one disclosed in U.S. Pat. Nos. 5,555,534 and 5,685,308, the disclosures of which are incorporated herein by reference. The receive beamformer 16 is configured into a plurality of channels for receiving electrical signals representing echoes or acoustic energy impinging on the transducer 12. Beamforming parameters including a receive aperture (e.g., the number of elements and which elements used for receive processing), the apodization profile, a delay profile, a phase profile and combinations thereof are applied to the receive signals for receive beamforming. For example, relative delays and amplitudes or apodization focus the acoustic energy along one or more scan lines. A control processor controls the various beamforming parameters for receive beam formation. Beamformer parameters for the receive beamformer 16 are the same or different than the transmit beamformer 14. For example, an aberration correction applied for receive beam formation is different than an aberration correction provided for transmit beam formation due to difference in signal amplitude.

FIG. 1 shows one possible embodiment of the receive beamformer 16. A channel 26 from each of the elements of the receive aperture within the array 12 connects to an amplifier 28 for applying apodization amplification. In other embodiments, apodization is applied after the buffer 36, and the amplifier 28 acts as a preamplifier. An analog-to-digital converter 30 digitizes the amplified echo signal. The analog-to-digital converter 30 may be placed elsewhere along the path or not provided for an analog beamforming implementation. The digital radio frequency received data is demodulated to a base band frequency by the base band demodulator 32. Any receive delays; such as dynamic receive delays and/or phase rotations are then applied by the time delay or phase rotator 34. The receive beamformer delayed or phase rotated base band data for each channel is provided to a buffer 36. The buffer 36 is a memory, such as a first in, first out memory or a corner turning memory. The memory is sufficient to store digital samples of the receive beamformer across all or a portion of the receive aperture from a given range. In the embodiment shown in FIG. 1, the summer of a receive beamformer 16 is provided as part of the image forming processor 20 rather than within the receive beamformer 16. In alternative embodiments, all or a portion of the image forming processor 20 is included within the receive beamformer 16, such as including the summer for summing the relatively delayed and apodized channel information together to form a beam.

The beamformer parameters used by the transmit beamformer 14, the receive beamformer 16, or both are responsive to a coherence factor calculated by the coherence factor processor 18. The coherence factor processor 18 is a general processor, digital signal processor, control processor, application specific integrated circuit, digital circuit, digital signal processor, analog circuit, combinations thereof or other now known or later developed processors for controlling the transmit beamformer 14, the receive beamformer 16, the image forming processor 20 or other components of the system 10. In one embodiment, the coherence factor processor 18 is the beamformer or system controller, but a separate or dedicated processor may be used in other embodiments. The coherence factor processor 18 is operable to determine a coherence factor as a function of ultrasound data from the elements of the array 12. For example, the coherence factor processor 18 connects with the buffer 36 for obtaining delayed or phase rotated channel data from each of the channels of a receive aperture. The coherence factor is calculated laterally across the array from the base band or RF data after delay or phase rotation for at least one range sample along at least one beam. In one embodiment, the coherence factor is calculated for each of the range samples along each receive beam, and the coherence factor processor 18 implements or includes a low-pass filter for determining a low-passed filtered coherence factor as a function of time or space. The coherence factor processor 18 is operable to determine a beamforming parameter, image forming parameter, or image processing parameter for adaptive imaging as a function of the coherence factor. The coherence factor processor 18 is operable to determine the degree of coherency of the receive signals across elements of an array. Parameters are then adaptively altered to reduce side lobe clutter in an eventual image.

The image forming processor 20 is a general processor, digital signal processor, application-specific integrated circuit, control processor, digital circuit, summer, filter, finite impulse response processor, multipliers, combinations thereof or other now known or later developed processors for forming image data from received signals. In one embodiment, the image forming processor 20 at least partially or entirely is included as part of the receive beamformer 16. In other embodiments, the image forming processor 20 is separate from the beamformer 16. The image forming processor 20 includes a single or multiple processors. For example, a synthesize processor 38 is provided with a beamformer summer 40 and a compound processor 42.

The image forming processor 20 is operable to image form as a function of the coherence factor. As used herein, image form includes forming data representing different spatial locations from received data, such as synthesizing scan lines, compounding data from multiple scan lines or other processes for generating data used to form an image from received information. For example, the image forming processor 20 is operable to form one or more simultaneous receive beams from receive data, form data representing a range of depths or lateral locations from sequential beams, combine data from different subapertures to form one or more lines of data, or form a number of beams by compounding other beams together. As part of the image forming process, the image forming processor 20 sets a number of simultaneous beams, a number of sequential beams, a number of subapertures, a number of focal zones in a same scan line, a number of beams compounded together, receive multiple beam parameters and combinations thereof for forming image data.

The beamform summer 40 is one or more digital or analog summers operable to combine data from different channels of the receive aperture to form—one or a plurality of receive beams. Cascaded summers or a single summer may be used. The beamform summer 40 is located in the receive beamformer 16 or the image forming processor 20. In one embodiment, the beamform summer 40 is operable to sum in-phase and quadrature channel data in a complex manner such that phase information is maintained for the formed beam. Alternatively, the beamform summer sums data amplitudes or intensities without maintaining the phase information.

The synthesize processor 38 is operable to form ultrasound lines from beams formed by the beamformer. The synthesis may involve inter-beam phase correction as a first step. The synthesize processor then combines the phase corrected beams through a coherent (i.e., phase sensitive) filter to form synthesized ultrasound lines and/or interpolates between beams to form new ultrasound lines.

A detector follows the synthesis operation. Any of various characteristics may be detected, such as amplitude, intensity (i.e., amplitude squared) or log-compressed amplitude. A log compressor is provided in one embodiment, but may alternatively be positioned after the compound processor 42.

The compound processor 42 is operable on detected data to incoherently combine multiple ultrasound lines. In one embodiment, the input to compound processor is the intensity data, and in another the input is the log-compressed data. The ultrasound lines combined may have differing temporal spectra or differing spatial spectra. Sequential focus stitching (e.g., zone cross-fade) may be performed in addition to frequency and spatial compounding.

In one embodiment, each synthesized processor 38 and each compound processor 42 are operable for a limited number of channels, such as a group of 16 channels 26. A plurality of synthesized processors 38 and compound processors 42 are provided for each group of channels. The outputs may then be used to synthesize further data or provide further incoherent combinations. In one embodiment, the compound processor 42 is provided with a feedback from the image processor 22 for compounding detected data.

The image formed data is output to the image processor 22. The output data represents one or more ultrasound lines at each of various depths. The image formed data is log compressed in one embodiment, but may be provided without log compression in other embodiments. Log compression is performed prior to or after the compounding by the compound processor 42.

The image processor 22 is operable to set a display dynamic range, filter in space and time using a linear or nonlinear filter which may be an FIR or IIR filter or table-based, and map the signal amplitude to display values as a function of a linear or non-linear map. The non-linear map may use any of various inputs, such as both filtered and unfiltered versions of the data being input in selecting a corresponding brightness. Data optimized for contrast may be input with the same or similar data optimized for spatial resolution. The input data is then used to select brightness or display intensity.

The image processor 22 scan converts the data and outputs the data as an one-, two-, or three-dimensional representation on the display 24. Since one of the beamforming parameters, image forming parameters, dynamic range, non-linear mapping, non-linear filtering or combinations thereof is selected or altered as a function of the coherence factor, the resulting image more likely shows the desired targets without artifacts from side lobe contributions. For example, the coherence factor is used to adaptively alter parameters for subsequent imaging, such as applying coherence factor for adjusting aberration corrections for beamforming parameters, and adjusting the type or amount of synthesis and compounding performed by the image forming processor 20.

FIG. 2 shows a method for adaptive imaging in one embodiment. Additional, different or fewer acts may be provided in the same or a different order than shown in FIG. 2. For example, one or more of the acts 64, 66 and 68 are not provided.

The adaptive process is implemented automatically, such as when an imaging session begins or a new mode of imaging is selected. Alternatively, a user request or detected motion of a transducer or within an image triggers the adaptive processing. Once the desired aperture size or other parameters are selected, further imaging is performed in response to those parameters.

In act 60, data is obtained from a plurality of transducer or other elements. Data is obtained for each element within a receive aperture in response to acoustic energy generated from a transmit aperture as a function of transmit beamforming parameters. In one embodiment, the receive aperture is all elements of an array, but a subset of elements may be used. Receive data is radio frequency data, in-phase and quadrature data or data having other now known or later developed formats. In one embodiment, the data is obtained in real time from the transducer array 12. In other embodiments, the data is obtained from previous imaging of the same region. The data represents information from each channel or element for one or more scan lines at a given depth. For example, data associated with a plurality of depths for an entire receive event for each channel is provided. The data of each channel is delayed relative to data of other channels for each scan line to be formed. As an alternative or in addition to delays, phase rotation may be used. After application of the delays or phase rotation, the coherence factor is calculated. Alternatively, the coherence factor is calculated before application of delays or phase rotation.

In one embodiment, a user is instructed to position a center of an image region on a bright reflector. Alternatively, the system identifies a bright reflector and automatically centers the aperture to be associated with the bright reflector or as a function of the position of the bright reflector. Any imaging region with or without centering on a bright reflector may be used.

In act 62, the coherence factor is determined as a function of the data. Any now known or later developed coherence factor may be used, such as the coherence factors disclosed in U.S. Pat. Nos. 5,910,115, 6,071,240, and 6,432,054, the disclosures of which are incorporated herein by reference. The coherence factor indicates an amount of coherence of received data across the receive aperture. High coherence indicates little aberration, and low coherence indicates a larger aberration effect.

In one embodiment, the coherence factor is calculated as a ratio of a coherent sum to an incoherent sum. In this embodiment, the coherence factor is mathematically represented as:

$$CF(t) = \frac{\left| \sum_{i=0}^{N-1} C(i,t) \right|^2}{N \sum_{i=0}^{N-1} |C(i,t)|^2}, \quad (1)$$

where, t is the time index, N is the number of array channels used for beam formation, and C(i, t) is the received signal of channel i after receive delays have been applied. The coherence factor is a real, non-negative quantity ranging from 0 to 1. The maximum of coherence factor occurs when the received array signals are identical across the array (i.e., perfectly coherent). The coherence factor of an on-axis point target without focusing errors is close to 1. Since coherence factor describes the coherence of received array signals, focusing imperfections caused by sound-velocity inhomogeneities reduce the coherence of the received signal. Low coherence results in high side lobes in the radiation pattern and degrades the contrast resolution. The coherence factor indicates focusing and image quality.

In another embodiment, the coherence factor is derived from the spectrum of the aperture data. The ratio of the spectral energy within a pre-specified low frequency region to the total energy is calculated as:

$$GCF(t) = \frac{\sum_{k=-M_0}^{M_0} |p(k,t)|^2}{\sum_{k=-N/2}^{N/2-1} |p(k,t)|^2}, \quad (2)$$

where, N is the number of points in the discrete spectrum, $M_0$ is the cutoff frequency specifying the low frequency region in the spatial frequency index and p(k,t) is an endpoint discrete Fourier spectrum of the aperture data. The Fourier transform is determined across channels for a given depth on each scan line. As a result, the coherence factor is determined for each scanned spatial location within an image region. In one embodiment, $M_0$ is selected as a zero value or the DC component of the spectrum. In other embodiments, $M_0$ is selected as a one, two or other value identifying a low frequency region including the DC as well as other spectral components. The low frequency or DC component of the spectrum in the numerator represents the coherent sum and the total spectral energy of the denominator represents the incoherent sum.

In alternative embodiments, the coherence factor is the amplitude of the coherent sum (i.e. the numerator of Equations 1 or 2). As yet another alternative, the coherence factor is the phase variance across the channels after the beamforming delays. A low phase variance indicates a high coherence. A parameter calculating the type of object, such as the speckle versus specular targets or the clutter type, such as grating lobe information, may be used in addition to the coherence factor to alter beamforming, image forming or other parameters, such as disclosed in U.S. Pat. No. 7,207,942 (application Ser. No. 10/627,290), the disclosure of which is incorporated herein by reference. Other calculations indicating an amount of coherence as a function of one or more variables may be used.

In yet another embodiment, the coherence factor for each spatial location in an image region is calculated as a function of different aperture sizes or other variables. The coherence factor is mathematically represented as:

$$GF(k,t,\theta) = \frac{\left| \sum_{n=no+\frac{k-1}{2}}^{n=no+\frac{k-1}{2}} s_n(t - \tau_n, \theta) \right|^2}{k \sum_{n=no+\frac{k-1}{2}}^{n=no+\frac{k-1}{2}} |s_n(t - \tau_n, \theta)|^2}, \quad (3)$$

where, $n_0$ is the aperture origin, n is the element index, k is an aperture size (number of elements), t is a time or depth and $\theta$ is a scan line angle from the aperture origin, $\tau_N$ is the beamform delay or corresponding phase rotation and $s_n$ is the receive signal for each channel in the aperture, such as the signal after application of delay and before summation with signals from other channels. In alternative embodiments, $s_n$ includes some partial beamformation. The coherence factor is calculated using the same depth and angle data but different aperture sizes k (i.e., selecting different groups of channels for inclusion in the calculation). The aperture origin may also be varied, such as varying the origin by one or more elements to the left and to the right of a given center origin. For each origin location, a range of aperture sizes, such as a full range by element steps or larger multi-element steps is calculated. The maximum coherent aperture size $k_{max}$ is determined based on the different coherence factors for different aperture sizes. The aperture size at which the coherence factor peaks or at which the slope of the coherence factor is below or above a certain threshold is identified as the maximum aperture size. Other parameters may be identified using coherence factor calculations, such as the center or aperture origin.

A coherence factor is calculated for each spatial location. In other embodiments, a plurality of coherence factors are calculated for a same spatial location, and a variable associated with a selected one of the coherence factors is used for further processing. For example, an aperture origin and/or an aperture size is varied for each coherence factor calculation at each of a subset of spatial locations by selecting appropriate data. The parameter with the desired coherence factor is then selected, such as selecting an aperture size at which the coherence factor peaks. In further alternatives, the coherence factor as a function of aperture size may be computed over multiple regions within an image region. The aperture size is for other regions are interpolated from the calculated regions. Alternatively, the aperture size is calculated independently for each spatial location.

In one embodiment, the coherence factor is low-pass filtered as a function of spatial location. Alternatively, an average over a moving region is used to determine the coherence factor. The filtering or averaging may be applied prior to or after variance of one or more factors, such as the aperture size. The filtering smoothes the deviation of the coherence factor as a function of spatial location and retains mean values. A two-dimensional moving average low-pass filter is used in one embodiment, but other filtering may be performed. The size of the kernel for low-pass filtering is a number of sample points corresponding to a −20 dB point spread function in azimuth times that in range, but other kernel sizes that adapt or are preset may be used.

In act 64, a beamform parameter is set as a function of the coherence factor. Either transmit beamforming, receive beamforming or both transmit and receive beamforming parameters are set as a function of the coherence factor. For example, an aperture size is set as a function of the coherence factor. By selecting an aperture size as a function of the coherence factor, an aperture associated with the maximum coherence is selected. The beam sum of a smaller number of receive channels may be larger than that of a larger number of receive channels when the imaging position is in a bright spot of a speckle region. Whether phase aberrations exist or not, the maximum of the beam sum may be obtained with a smaller receive aperture size for the imaging point in a dark spot of a speckle region. Such signals of the dark spots are enhanced to reduce speckle variance. With a sufficiently large receive aperture size (e.g., the number of the center receive channels is larger than one half of the total receive channels), the beam sum corresponding to the imaging points in the anechoic region is small relative to that in the speckle region.

When phase aberrations are present or when the imaging point is located in the dark spots, beam formation with a smaller receive aperture may result in a larger beam sum for imaging points in the speckle region. Coherence factor thresholding distinguishes speckle signals from the incoherent noise (i.e., side lobe contribution). Adapting the receive aperture as a function of the coherence factor reduces undesired contribution from side lobes. Once signals from the side lobes (i.e., anechoic region) and the main lobe (e.g., the speckle region) are identified, the optimum number of receive channels at each spatial location, $N_{optimal}(t)$, is adaptively determined as:

$$\begin{cases} N_{optimal}(t) = \{N \mid \max(S(N, t)), N = N_{min}, N_{min} + 1, \ldots, N_{max}\}, \\ \quad \text{if } LPF\{CF(t)\} \geq CF_{threshold} \\ N_{optimal}(t) = \{N \mid \min(S(N, t)), N = N_{min}, N_{min} + 1, \ldots, N_{max}\}, \\ \quad \text{if } LPF\{CF(t)\} < CF_{threshold} \end{cases}$$

where, $N_{max}$ is the number of total active channels on receive, $N_{min}$ is the lower bound of $N_{optimal}$ that is used to avoid degradation of spatial resolution and to preserve signal-to-noise ratio, and N is the number of center receive channels used for beam sum S(N,t), ranging from $N_{min}$ to $N_{max}$. The effective size and associated elements of the aperture is determined. The coherence factor is calculated for different aperture sizes using the same data. Different channels are selected for inclusion within the aperture as a function of the selected aperture size. The coherence factor is then used to identify a coherence peak or a coherence within a threshold amount. For example, maximum coherence is associated with 32 elements of a 64-element array. Coherence factor is calculated for each possible array size or for samples within the possible array sizes. Interpolation may then be used to identify a desired array size.

The effective coherent aperture size is minimized to suppress unwanted signals, but kept as large as possible to maintain desired signals and spatial resolution. $CF_{threshold}$ is used to identify the desired aperture size. When low-passed coherence factor of a spatial location (LPF{CF(t)}) is smaller than $CF_{threshold}$, the imaging point is considered to be at the side lobes or in the anechoic region. $N_{optimal}(t)$ should minimize the beam sum S(N,t) so that the signals coming from the side lobes or the anechoic region can be suppressed. Otherwise, $N_{optimal}(t)$ should maximize the beam sum S(N,t) to enhance the signals from the main lobe or the speckle region. The image quality degradation resulting from sound-velocity inhomogeneities can be reduced.

If the main lobe signal is misjudged as an incoherent noise, image artifacts (e.g., black holes) may be introduced. On the other hand, image artifacts are generally minor if incoherent noise is determined as a main lobe signal because the beam sum in this case is relatively small compared with that in the speckle region. Hence, lower $CF_{threshold}$ and larger $N_{min}$ are used in one embodiment, but other values may be used. This technique is independent of the source of the artifacts, so may be used to reduce other types of focusing errors. The main lobe width may be increased due to the fact that the coherence factor map is low-pass filtered to reduce the coherence factor variations. The performance of the adaptive receive aperture technique may be further enhanced if $CF_{threshold}$ is optimized for different levels of phase aberrations.

In a further embodiment, the aperture size is set as described above as a subaperture with or without a minimum subaperture size. Other subapertures are also provided. The size of each subaperture may be varied as a function of the coherence factor. The coherence factor for each subaperture is calculated by positioning the aperture origin in different locations along the array 12 based on the desired subaperture locations.

Since receive beamformation uses dynamic focusing, a different aperture size may be used for different focal depths. For transmit operation, the aperture size at the focal region is used. Alternatively, an average or other combination of aperture sizes over a range of depths is used for transmit beamformation.

In a further refinement of aberration correction, correlation based delays are determined using data from the aperture selected as a function of the coherence factor. The aberration correction is performed using the maximum coherent information while minimizing the contribution of incoherent information to the aberration correction.

As an alternative or in addition to setting an aperture size, the apodization profile is set as a function of the coherence factor. The apodization profile adjusts the relative contribution of different channels to a beamformed signal. By reducing the contribution from channels not sufficiently coherent with the other channels, acoustic clutter may be reduced. For example, a uniform apodization is used for a coherence factor indicating a large aperture size. A hamming apodization is applied as the apodization profile where a small aperture is indicated by the coherence factor. The apodization profile may be applied while maintaining a same aperture regardless of the coherence factor or in addition to changing a size of the aperture as a function of the coherence factor. For example, the aperture size may be sufficiently small that further reduction in aperture size is undesired. The aperture size is reduced but not to a value associated with maximum coherence. The apodization profile is then altered to use the selected aperture but with reduced contribution from channels associated with less coherent data. The apodization profile alters the effective aperture size. In an alternative embodiment, different apodizations are applied to the same data for determining a maximum coherence factor.

In yet another alternative or additional embodiment, a delay and/or phase profile is set as a function of the coherence factor. Different delays or phases may be applied to the data from each channel to maximize a coherence factor for each spatial location. Multiple beams may be simultaneously transmitted or received where strong coherence is provided. To transmit or receive with multiple beams simultaneously, the phase and/or delay profiles as well as the apodization profiles are altered to provide the multiple simultaneous foci. If coherence factor is high, the transmit delay or phase profile may be altered to provide for a wider transmit beam, such as a weakly focused beam, unfocused beam (i.e., plane wave), or a defocused beam. A wider transmit beam may allow more parallel receive beams.

In yet another embodiment, a complex aperture parameter is set as a function of the coherence factor. For example, any two or more of the apodization profile, aperture size, delay profile and phase profile are set as a function of the coherence factor.

After the beamforming parameters are set, acoustic energy is transmitted as a function of the transmit beamforming parameters. Echoes are then received as a function of the receive beamforming parameters. As a result, one or more of the contrast resolution, temporal resolution, detail resolution or SNR is improved.

In an alternative or additional embodiment, an image forming parameter is set as a function of the coherence factor in act 66. For example, a number of beams to be synthesized or compounded can be set. As another example, transmit multi-beam parameters, such as the number, depth and angle of transmit foci, or receive multi-beam parameters, such as number of beams per transmit angle, can be set. As yet another example, a number of sequential transmit beams is set.

For example, an aperture size is selected as a function of the coherence factor as discussed above. A number of receive subapertures is increased from one to a sufficient number of overlapping or separate subapertures to use most of or the entire available array. In one embodiment, the aperture size for each subaperture is selected as a function of the associated origin of each subaperture and the coherence factor. For example, a sub-aperture size of 32 elements is selected for a 64-element array. These overlapping subapertures are then used, such as the 32 left most elements, the 32 center most elements and the 32 right most elements. For channels within each subaperture, the channel data is coherently summed. A final receive beam is formed by incoherently summing data from each of the coherently beamformed subapertures.

In act 68, other parameters are set as a function of the coherence factor in addition to or as an alternative to the beamforming parameters of act 64 or the image forming parameters of act 66. For example, one or more of the dynamic range, a non-linear filter, a non-linear map and combinations thereof are set as a function of the coherence factor. For example, an offset and scaling in the log domain is set as a function of the coherence factor. Greater compression is provided for more coherent data and lesser compression for data with a lesser coherence factor. The offset is set as further or closer to noise signal levels to counteract artifacts due to incoherencies. As another example, a type of filtering, filter weights, a number of taps or other filtering parameter is adjusted as a function of the coherence factor. For example, a non-linear filter is provided for outputting data as a function of both the receive data as well as the coherence factor. The output is a non-linear function of the inputs. Data associated with coherent information or spatial locations associated with the greater coherence are emphasized in a non-linear relationship relative to data or spatial locations associated with a lesser coherence. The video filter or other filters of the image processor 22 are used to implement the non-linear filtering. As yet another example, receive data is mapped to display colors or intensities in a non-linear function as a function of the coherence factor. The non-linear map to be used is selected as a function of the coherence factor.

In an additional or alternative embodiment, the coherence factor is used as an amplitude weight. A high coherence factor corresponds to better focusing quality than a low coherence factor. The coherence factor is used as a weight for the beamformed, detected, scan converted or other ultrasound data. Where the coherence factor is high or closer to one, the image intensity is generally maintained. Where the coherence factor is low, the contribution of the data to the image is reduced by reducing the intensity. As a result, information from side lobes or off axis targets due to focusing errors is reduced.

While the invention has been described above by reference to various embodiments, it should be understood that many changes and modifications can be made without departing from the scope of the invention. For example, any image obtained using the proposed techniques above may be combined with a corresponding coherence factor map to further improve image quality.

It is therefore intended that the foregoing detailed description be regarded as illustrative rather than limiting, and that it be understood that it is the following claims, including all equivalents, that are intended to define the spirit and scope of this invention.

We claim:

1. A method for adaptive ultrasound imaging, the method comprising:
   (a) obtaining data from a plurality of transducer elements;
   (b) determining a coherence factor as a function of the data; and
   (c) setting an image forming parameter as a function of the coherence factor,
   (d) processing beamsummed data with the image forming parameter, said parameter used to synthesize scan lines, compound data from multiple scan lines, set a number of sequential beams, set a number of sub-apertures, set a number of focal zones, or combinations thereof, and (e) forming an image as a function of the coherence factor and beamsummed data.

2. The method of claim 1 wherein (c) comprises setting a parameter for synthesis.

3. The method of claim 1 wherein (b) comprises calculating a ratio of coherent sum to an incoherent sum.

4. The method of claim 1 wherein (b) comprises calculating phase variance across transducer elements.

5. The method of claim 1 wherein (b) comprises calculating the coherence factor as a function of the data altered by beamforming delays prior to summing the data for beamforming.

6. The method of claim 1 wherein (c) comprises setting a number of simultaneous beams.

7. The method of claim 1 wherein (c) comprises setting a number of sequential beams.

8. The method of claim 1 wherein (c) comprises setting one of: a number of sub-apertures, a number of focal zones in a same scan line and combinations thereof.

9. The method of claim 1 wherein (c) comprises setting a number of beams compounded together.

10. The method of claim 1 wherein (c) comprises setting one of: transmit multibeam parameters, receive multibeam parameters and combinations thereof.

11. The method of claim 1 wherein (c) comprises setting a number of receive sub-apertures;

further comprising:

(d) coherently summing ultrasound data within each of the sub-apertures; and (e) incoherently summing coherent sum outputs of at least two sub-apertures of (d).

12. A system for adaptive ultrasound imaging, the system comprising:

a transducer having a plurality of elements;

a coherence factor processor operable to determine a coherence factor as a function of ultrasound data from the elements; and an image forming processor configured to form images as a function of the coherence factor;

wherein the image forming processor is configured to set one of: a number of simultaneous beams, a number of sequential beams, a number of sub-apertures, a number of focal zones in a same scan line, a number of beams compounded together, transmit multibeam parameters, receive multibeam parameters and combinations thereof for processing beamsummed data.

13. The system of claim 12 wherein the image forming processor comprises a compound processor.

14. A method for adaptive ultrasound imaging, the method comprising:

(a) obtaining ultrasound data from a plurality of transducer elements;

(b) determining a coherence factor as a function of the ultrasound data;

forming and displaying an image with a dynamic range, filtering with a nonlinear filter, and mapping with a nonlinear map; and (c) adaptively selecting the dynamic range used in the displaying, selecting the nonlinear filter used in the filtering, selecting the nonlinear map used in the mapping, or combinations thereof as a function of the coherence factor.

15. The method of claim 14 wherein (c) comprises setting the dynamic range as a function of the coherence factor.

16. The method of claim 14 wherein (c) comprises setting the nonlinear filter as a function of the coherence factor.

17. The method of claim 14 wherein (c) comprises setting the nonlinear map as a function of the coherence factor.

18. A system for adaptive ultrasound imaging, the system comprising:

a transducer having a plurality of elements;

a coherence factor processor configured to determine a coherence factor as a function of ultrasound data from the elements; and an image processor configured to adaptively select a dynamic range, a nonlinear filter, a nonlinear map, or combinations thereof as a function of the coherence factor and then operable to use the selected dynamic range, use the selected nonlinear filter, use the selected nonlinear map, or combinations thereof, respectively.

* * * * *